Jan. 29, 1957 L. W. ORR 2,779,652

FILING APPARATUS

Filed July 8, 1952 4 Sheets-Sheet 1

INVENTOR
LYMAN W. ORR
BY
Laurence R. Brown
ATTORNEY

Jan. 29, 1957 L. W. ORR 2,779,652

FILING APPARATUS

Filed July 8, 1952 4 Sheets-Sheet 2

INVENTOR
LYMAN W. ORR
BY
Laurence R. Brown
ATTORNEY

Jan. 29, 1957 L. W. ORR 2,779,652

FILING APPARATUS

Filed July 8, 1952 4 Sheets-Sheet 3

INVENTOR
LYMAN W. ORR
BY Laurence R. Brown
ATTORNEY

INVENTOR
LYMAN W. ORR
BY
Lawrence R. Brown
ATTORNEY 2,779,652

FILING APPARATUS

Lyman W. Orr, Ann Arbor, Mich., assignor to Burroughs Corporation, a corporation of Michigan Application July 8, 1952, Serial No. 297,714

20 Claims. (Cl. 312—319)

This invention relates to means for indexing, classifying, and automatically selecting randomly placed record files from filing racks or cabinets by means of coded identifying indicia individual to the respective record file units.

In card indexing systems and other record filing systems great care must be used to separate each filing unit into the proper category or sub-category generally indicated by a particular position in a filing case. Cards may be misplaced in such systems causing either extensive searches for the misplaced cards resulting in the loss of time or the overlooking of vital information resulting in an erroneous collection of stored data. Such systems also require the expenditure of large amounts of filing time which could be saved by randomly placing the filing units in the file.

One object of the invention, therefore, is to provide an improved automatic file selection system for accurately and quickly selecting randomly interspersed filing units.

Although it is possible to select certain statistical data in a card indexing system by means of a plurality of individual coded distinguishing characteristics representing digits of a suitable numbering system, each digit of which is selected in sequence by actuating selector means, this type of system is not feasible for rapid access or selecting. In general it is further necessary to provide separate means for selecting and withdrawing randomly placed files. Accordingly, a single selective operation for both selecting and displacing a file unit having a multiple digit code is desired to provide fast access time with a minimum of equipment.

It is, therefore, another object of the invention to provide simplified mechanical apparatus for quickly and accurately selecting and displacing filing units identified by multiple digit code indicia in a single functional step.

To preserve files in secrecy and to prevent dust from accumulating, storage is universally provided in filing cases or cabinets with movable access drawers. Before such equipment in the prior art could be adapted to the selection of coded cards it was necessary to open the drawer. In these systems the minimum access time includes the drawer opening operation which is not productive in selecting the desired records from the file.

Another object of the invention, therefore, is to improve the efficiency and access time of automatically selectable record filing systems by providing drawer actuated selecting means so that the card is placed in a readily accessible selected position by the time the drawer is opened and so that external power sources are not necessary in operating the selective mechanism.

In attaining a faster access time for automatic file selection systems the rapid operation of selecting mechanisms may be required to exert a large force upon the selected records. The cards or other record conveying vehicles must be adapted for rapid engagement, and quickly operating selective mechanisms must, therefore, become unduly complex and heavy when a number of cards must be moved simultaneously. It is important, therefore, that only the selected file units be displaced by the selecting mechanism and that the filing units and system be tailored for rapid access operation. The record storage filing unit or filing vehicle, which may comprise an index card or a pocket type enclosure member such as an envelope for carrying papers or other records should be adapted for fast engagement and rapid motion. In accordance with the present invention therefore, a two piece filing unit with one record portion for carrying the intelligible data, and the other indicia portion having selectively engageable coded indentations is afforded permitting card construction with both optimum selection and record storing facilities. In addition such a unit may be constructed in accordance with the present invention to have a novel selective mechanism for permitting ready access and rapid selection.

It is another object of the invention, therefore, to provide improved selection means for imparting an operating force to move only the selected filing vehicles, and to provide two portion filing vehicles adapted for rapid selective engagement operation with a minimum of applied operating force.

Other objects and features of advantage of the invention will be found throughout the following detailed description of the invention. Those features believed descriptive of the nature of the invention are defined with particularity in the appended claims.

The foregoing objects are realized in accordance with the present invention in a random access filing system for automatically selecting those coded filing units having a desired coding indicia. Individual selection of desired records is accomplished by engagement of relatively movable external coded selecting means with a movable individually coded portion of the filing units thereby displacing the filing units to a readily accessible position in a single selective operation.

An important feature of the invention is the provision of drawer actuated means which automatically selects the desired filing units in response to the opening of the file cabinet drawer containing the units thereby affording a rapid access time.

Another important phase of the invention is embodied in the filing units having respectively movable indicia and record portions plus a mechanical linkage system for allowing the relative movement therebetween. Thus, engagement of an external coded selection member with the coded indicia portion of the filing unit causes the record portion of the filing unit to move to a readily accessible position. Coding indicia structure is so positioned on the two portion filing units and oriented in the multiple digit coded external selective mechanism to permit selection in a single operation of only those coded filing units having the desired indicia thereby greatly simplifying the requisite apparatus and permitting a rapid access time.

The detailed description of the invention and its mode of operation which follows may be readily understood when considered in connection with the accompanying drawing, in which:

Figs. 1*a* through 1*g* are diagrammatic views of different operational phases unique to the drawer actuated filing units selecting mechanism of the present invention;

Figure 7:
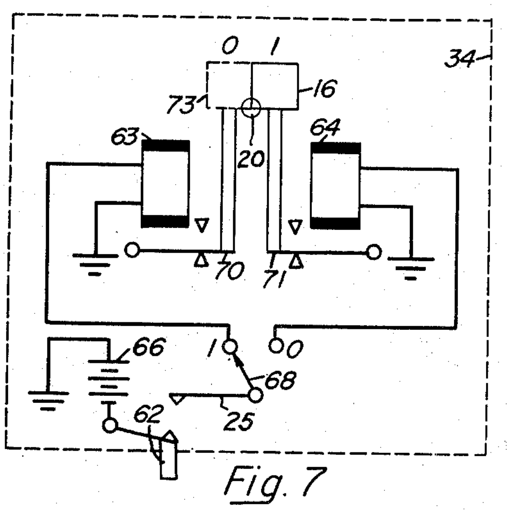
Figure 8:
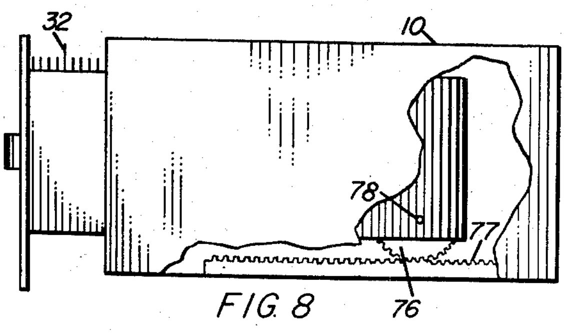
Figure 6A:
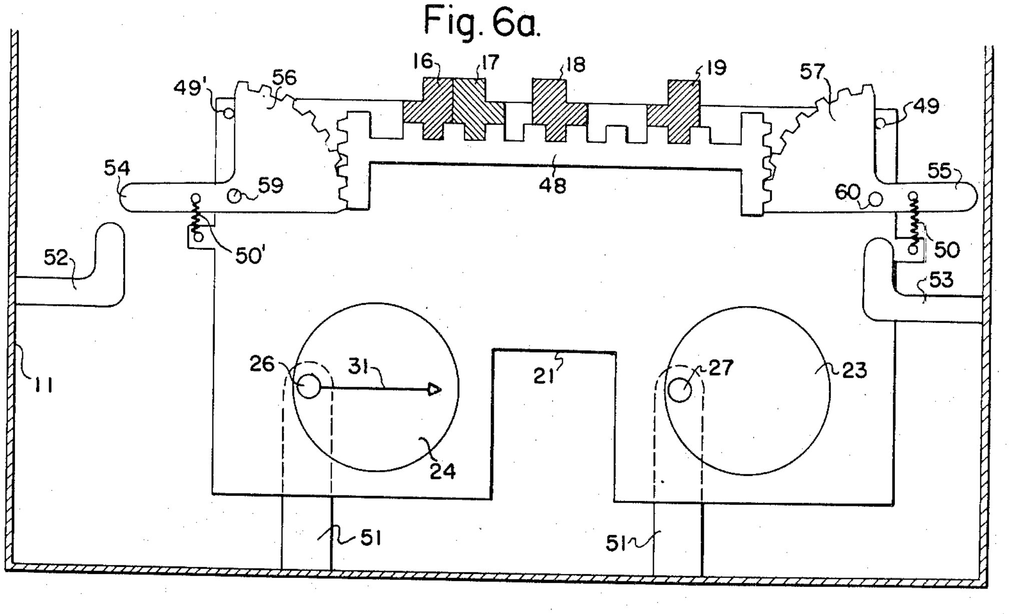
Figure 6B:
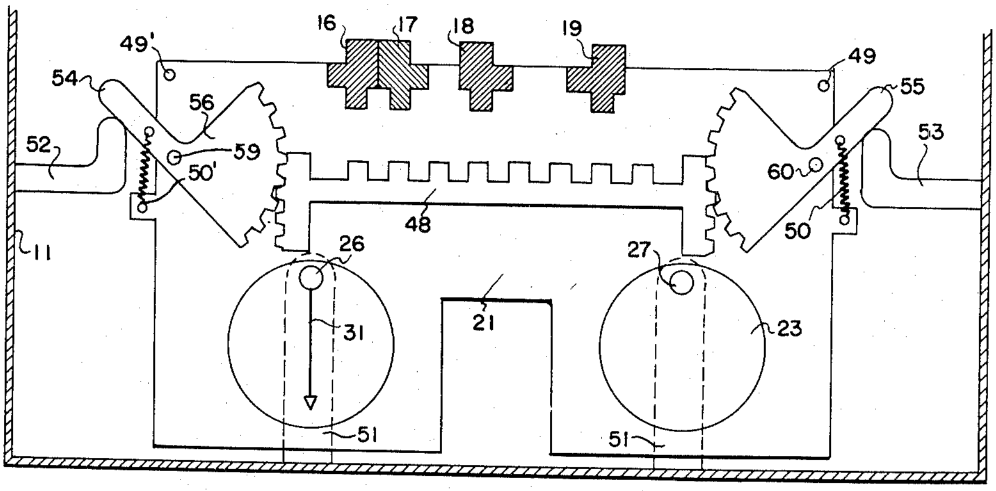

Figs. 6*a* and 6*b* are elevation sectional views of a code element locking mechanism for drawer actuated filing unit selecting systems constructed in accordance with the invention;

Fig. 7 is a schematic view of code element selector means used in conjunction with the invention;

Fig. 8 is a side view, partially in section, of a drawer actuated file record driving system; and Fig. 9 is a perspective view of a sub-assembly embodiment of a drive mechanism for actuating an automatically selective filing system, in response to the opening of an access drawer as taught by the invention.

Throughout the specification and drawings like elements will be designated with similar reference characters to facilitate comparison.

Figure 1:
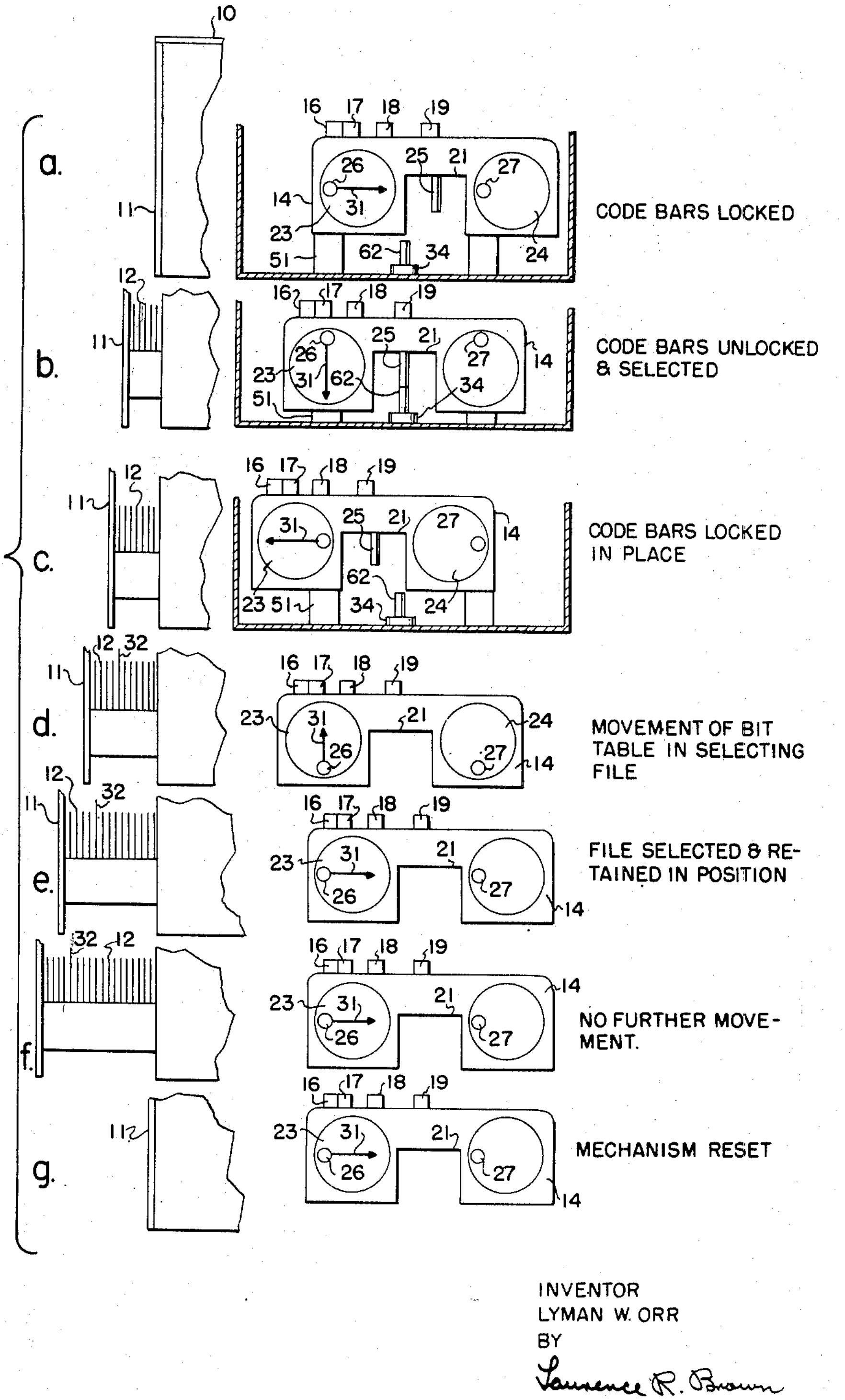

Several different operational phases of the drawer actuated selecting mechanism, as illustrated in the several views of Fig. 1, will first be considered in particularity, wherein a filing case or cabinet 10 is shown having a movable access drawer 11 therein to hold a pack of randomly placed coded record filing units 12. A chronological series of drawer positions, together with corresponding phases of operation of movable coding selector positioning means 14 utilized in selecting and displacing desired filing units from the pack 12, is shown in the respective views of Figs. 1*a* to 1*g*. For purposes of simplicity in notation, hereafter filing units making up the pack 12 will be termed "cards" where convenient.

Figure 2:
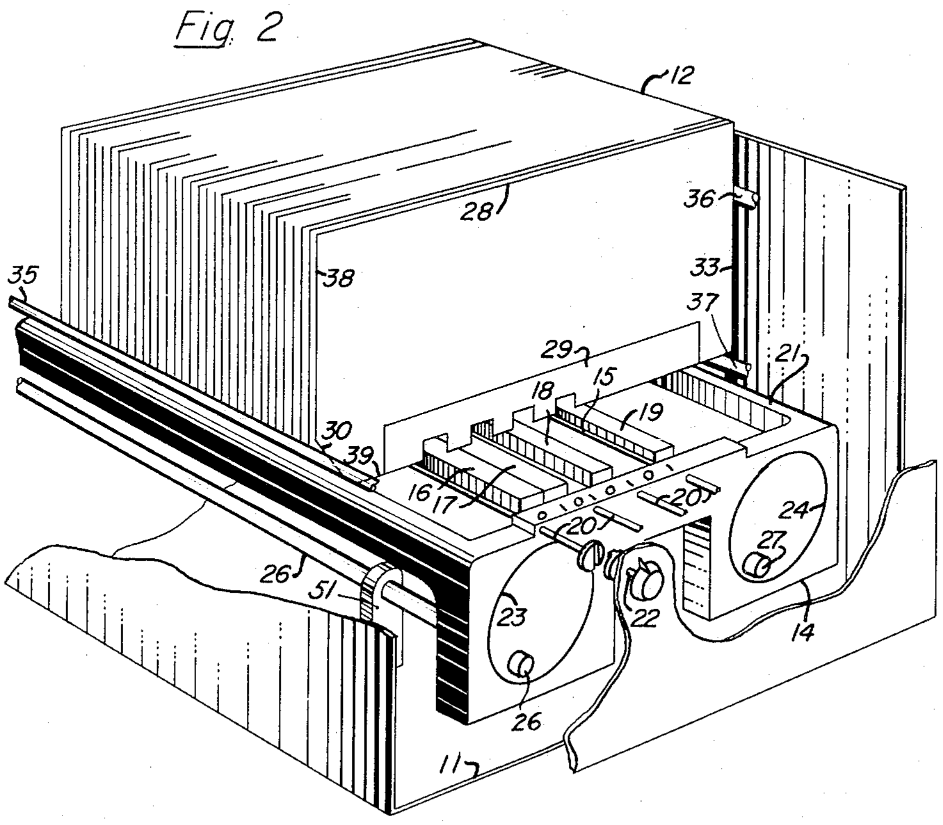
Fig. 2 is a perspective sectional view illustrating operation of cooperatively engaging record storage filing units and a coded selective engagement mechanism constructed in accordance with the teachings of this invention.
Figure 2:
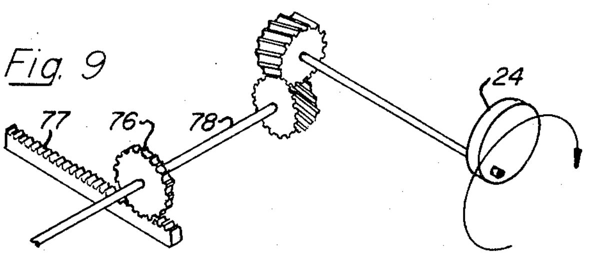

To more readily understand the operation of the movable coding selector positioning means 14 in the several phases of operation illustrated by Fig. 1, the perspective view of Fig. 2 may first be considered. Therein a plurality of individually movable coded selector bars or bit elements 16, 17, 18, 19 representing code digits or bits are affixed for selection by relative positioning on the bit element table 21. The positioning of these elements may represent different binary code combinations or other suitable selective coded information which may be used to distinguish the several cards in the pack 12 from each other. Such coding systems are well known in the art and, therefore, need not be discussed in great detail. It may be mentioned, however, that the desired number of coding elements may be selected along with a suitable radix numbering system to afford as many as 100,000 individually selectable items without undue complexity.

For use with a binary coding system each of the bit elements 16–19 is square in cross section and is pivoted about a rod 20 (Figs. 2 and 7) connected at one lower corner for rotation into one of two adjacent positions "0" and "1." Manual coding may be readily accomplished by means of a selection shaft 22 (Fig. 2) extending to the front of an associated cabinet assembly to rotate a corresponding one of the bit elements 16–19 into its different coded positions. To simplify the drawing only one selector shaft 22 is shown associated with the bit element 16, but it is readily apparent that selection of the coded position of the other bit elements may be accomplished in a like manner.

Remote or alternative selection of the desired code may be performed by the apparatus shown schematically in Fig. 7, wherein the manually operable shaft 22 is replaced by a solenoid actuated electrical system, which will be described in more detail hereinafter. Other coding systems are entirely feasible for use with the invention and the selective mechanisms may comprise entirely conventional means for selecting a code by relative placement of coding elements along the bit table 21 such as disclosed in the U. S. Patents No. 867,618 and 1,251,502 issued respectively to W. M. Stretch and S. L. Gilfillan.

One indicia structure is indicated by the coded notches in the lower edge of the foremost card of the pack 12 (Fig. 2). These notches for use with a binary code and adapted for use with the pivoted selector elements 16–19 are of equal depth and are or may be of equal or varying width with unindented separation tabs of an integral multiple of the width of the notches. The illustrated notches and bit element positions exemplify respectively the two different four digit binary code groupings representing decimal numbers zero and nine respectively.

The bit table 21 is adapted by means of parallel motion cams 23 and 24 for a general rotary movement of the parallel table plane with the bit elements 16–19 defining an arc contiguous to the bottom edge of the coded engagement structure on the cards which are biased by the force of gravity or suitable biasing means in the direction of the bit element table 21. To effect this movement the cam shafts 26 and 27 are mounted off center in the circular cams 23 and 24 which are ganged for rotation in unison. The shafts 26 and 27 are rotatably supported against lateral movement with respect to the drawer walls by means of fixed support members 51.

Filing units for engagement with the bit elements 16–19 are made of two relatively movable portions comprising the record card or filing vehicle 28 and the movable coding indicia engaging means 29 (Fig. 2). Thus, simplified selective means is afforded to permit engagement of a plurality of coded bit elements with a like plurality of coded card notches to effect selection of desired cards and to likewise permit rejection of non-engaging coded cards without disturbing the positions of non-selected cards. This feature of the invention will be hereinafter explained in more detail upon reference to Figs. 3, 4 and 5. It is sufficient for an understanding of the several phases of operation illustrated in Figs. 1*a* through 1*g* to recognize that the coding group selected by positioning the bit elements 16–19 will designate a particular card or group of cards which will be selected and displaced from the pack 12 upon a wiping or contiguous motion of the bit elements 16–19 along the coded edge or indicia engaging means 29 of the cards.

When the drawer 11 is closed in initial position, as shown in Fig. 1*a*, the bit elements 16–19 are locked in an unselected position. The bit table 21 is held by cams 23 and 24 in different positions with respect to the drawer 11, and therefore the cabinet 10, during the different portions of the operating cycle designated by respective orientations of the arrow 31. In the initial position the bit table 21 is raised above the bottom of drawer 11 by at least half the diameter of cams 23 and 24. Upon lowering of the table 21 to the next position of Fig. 1*b* selection of a code may be made by suitably code selection means generally indicated at 34 and shown more particularly in Fig. 7 or by manual placement of the bit elements. Means for unlocking the bit elements 16–19 for movement on the table 21 when in its lowered position will be hereinafter described in detail in connection with Figs. 6*a* and 6*b*. For automatically performing each functional phase of selecting the filing units and the desired coding arrangement in response to relative motion of the drawer 11 and filing case 10, the cams 23 and 24 are simultaneously rotated in a clockwise direction by a mechanism such as that of Figs. 8 and 9.

After unlocking the bit elements 16–19, the code selection means 34 as will be more fully explained hereinafter is actuated by the plunger arm 25 to automatically position the bit elements in response to a preselected coding group. A further small degree of movement of the drawer as indicated in Fig. 1*c* will relatch or lock the bit elements in the selected coded position by raising the bit table 21 to the same relative level as shown in Fig. 1*a*. Only when the table is lowered as in Fig. 1*b* is the code selection means 34 actuated while intermediate the bit element locking or unlocking phases of the operating cycle. The operational functions are therefore spread out to permit a considerable force to be exerted by the relative motion of the drawer 11 and case 10 for all operating functions. By locking the elements 16–19 for the card selection process which follows, they can be made to withstand any frictional shear stresses encountered without disturbing their coded selection positions.

Motion imparted to the table by further opening the drawer, as shown in Fig. 1*d*, causes an upward rotary motion of the bit elements which wipe laterally across the coded edges of the filing card units of the pack 12 to effect card selection. The selected card 32 is thereby forcibly displaced from the pack 12 automatically during this phase of the operation cycle. The two pieces 28, 29 of the filing unit (Fig. 2) are provided for relative movement by means of a mechanical linkage, as hereinbefore mentioned, so that only selected record portions of the cards are moved. The linkage is constructed to retain the selected card 32 in a position distinctly accessible from the pack 12 as the cams 23 and 24 rotate through a relatively large angle and preferably until the table 21 returns to its original position.

Means is also provided for preventing further rotation of cams 23 and 24 as the drawer continues to open to the postion of Fig. 1*f*, as discussed hereinafter in connection with Figs. 8 and 9. Thus, the selected card remains in a position out of the pack 12 until the drawer is closed and a further selection cycle is initiated. Closing of the drawer (Fig. 1*g*) thereafter resets or rewinds the selection mechanism so that a subsequent selection may be automatically made in the same manner upon reopening the drawer 11. The card is released and replaced in pack 12 during the succeeding cycle of operation as the bit table 21 is moved downward to the position of Fig. 1*b* and before a subsequent selection phase of operation starts.

Therefore, from a consideration of these principles of operation it is evident that there is provided by the hereinbefore described aspects of the invention novel filing unit or record card selection apparatus which affords automatic selection of coded randomly placed cards or other filed records upon opening the file cabinet access drawer.

Returning to Fig. 2 for further consideration, it is readily recognized that the cards in the pack 12 are held by a rack comprising card limit stops 35, 36 and 37 so that the force of gravity biases the notched or coded sections 29 of the cards toward the complementary code engaging means afforded by bit elements 16–19 in this embodiment. The relatively movable code engaging means 29 of the card may be held against a lower limiting position so that the externally operated bit elements 16–19 cause either lateral or vertical movement of the movable coded card sections 29 respectively upon engagement or non-engagement of the coded sections. Lateral movement of any card section 29 is caused to vertically displace its associated record card 28 from the pack 12 by means of a suitable mechanical linkage. In this manner only the selected cards are moved from the pack 12, as hereinafter will be further clarified in the discussion of Figs. 3, 4 and 5, resulting in the necessity for little operating force during this portion of the operation cycle.

Motion of the cards in a lateral direction is prevented by the card limit stop members 35 and 36 coacting respectively with the edges 30 and 33 of the cards. The edge 30 is formed by removing a corner of the generally rectangular card body at an angle in the order of 135° with respect to the two adjacent edges 38, 39. Thus, the weight of the cards on the stop 35 tends to force them laterally to the right against the stop 36 and thereby hold them secure from lateral movement even with the contiguous wiping motion of the bit element members to the right along the coded indicia section 29 of the cards. The third stop 37 along the bottom of the cards in the pack 12 keeps the movable indicia sections 29 of the cards in a lower limiting position and affords a bearing surface used when engagement by the bit elements causes motion of the movable indicia sections 29 to the right in order to vertically raise the selected record cards out of the pack.

Figure 3:
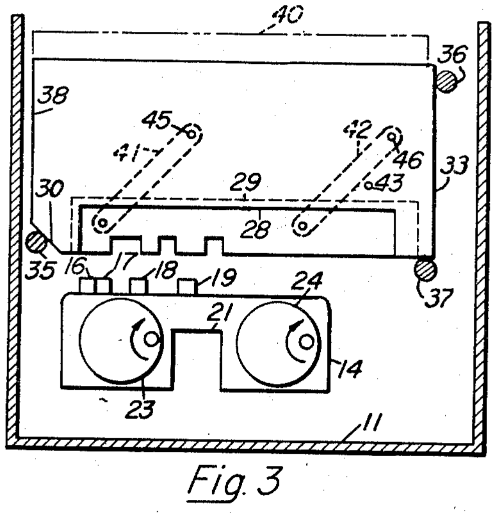
Figs. 3, 4 and 5 are elevation sectional views of coded record storage filing units together with complementary external record selecting mechanisms respectively showing static, selecting and rejecting phases of the operation cycle.
Figure 4:
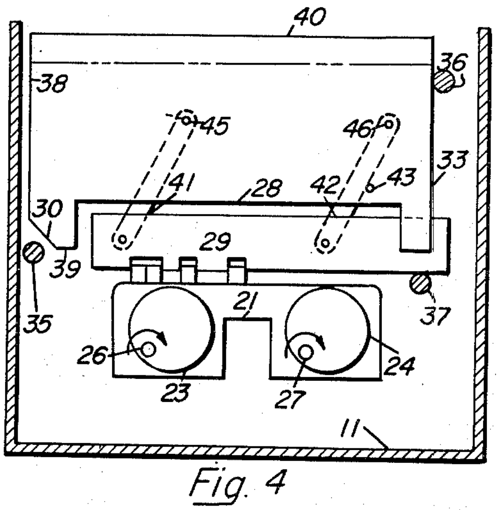

The static condition assumed by the cards at a time just before the initial selection engagement operation, comprising the wiping contiguous motion along the cards toward the right imparted to the bit table 21 by the cams 23 and 24, is shown in Fig. 3. In this condition both card sections 28 and 29 are seated on the card stop limit member 37 in their lowermost position. Rotation of the cam members 23 and 24 results in an upward forcing of the bit elements 16–19 into mating engagement with the corresponding notches of the selected card. Further cam motion after engagement forces the movable indicia section 29 of the selected card to the right as shown in Fig. 4. By way of the parallel bar mechanical linkage 41, 42 the selected card 28 is vertically forced into the projected position shown by the dot-dash line 40, as may be more readily seen in the later stage of operation suggested by Fig. 4. A linkage stop element 43 may be provided for engaging the linkage member 42 at a position before dead center to assure that the cards return to their position in the pack, since the linkage element 42 has reached its lateral limiting position and the bit table 21 travels primarily in a downward direction during the remainder of the operation cycle.

Removal of the selected card from the pack may readily be accomplished from the selected position of Fig. 4 by manual displacement without moving or disengaging any mechanisms as free vertical motion of the card from the selected position is afforded by the coded engagement members comprising bit table 21 and the coding indicia means 29. The entire vertically positioned filing unit assembly is therefore readily accessible for removal or consultation of recorded data without further equipment or complicated machinery and need not be replaced in the same order. The simple parallel bar linkage 41, 42 provides relative movement between the card portions upon non-engagement of external coding elements and further affords simultaneous vertical motion of the record card 28 upon engagement of the coding elements in effecting lateral motion of the coded indicia means 29. The vertical motion distinguishes the selected card and displaces it into an easily accessible position. The desired degree of vertical movement may be effected by those skilled in the art in choosing the desired linkages and linkage parameters. A relatively simple linkage such as that shown is commercially preferred, however, since it affords adequate vertical motion of the selected card with simple linking mechanical elements 41, 42.

The two piece filing unit allows selection of the record card or pocket or pocket type enclosure member 28 of a material having desired properties which may be entirely distinct from those of the coded engagement section 29. The latter section should be mechanically rigid to afford positive and repeated selection engagement with the adjustable indicia matrix elements 16–19 and is preferably metallic. The record section 28, however, should be of cardboard or other suitable recording medium not generally being mechanically rigid enough for the requirements of the coded engaging structure. The record card may be placed in a suitable aluminum framing member to afford more stable bearing surfaces for the linkage spindles 45 and 46.

Figure 5:
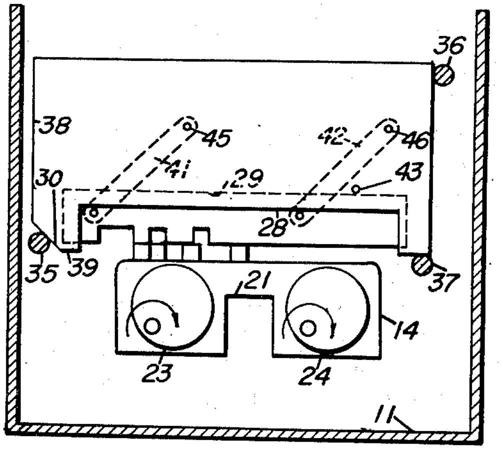

The parallel bar mechanical linkage 41, 42 between the card record and indicia sections 28 and 29, in addition to the selection action heretofore described, also functions to permit rejection of non-selected cards without raising the more numerous and therefore heavier record card portions 28, as shown in Fig. 5. During the wiping motion of the bit elements across the coded edge of the cards, the linkage bars 41 and 42 force the indicia sections 29 of the rejected cards in a limited leftword movement. Only the engaged or selected card portions 29 which drop into registry with the bit elements 16–19 are moved to the right by motion of the bit table 21 resulting in the vertical removal of the record portion 28 from the pack of unselected cards. It is to be noted that no vertical motion is imparted to portions 28 of the non-selected cards so that even a small actuating force during this portion of the selection cycle will move the selected cards out of their static position in the pack. Because of this, little inertia will be present and equipment may be light in construction and may be made with an extremely fast access time.

In this aspect of the invention, therefore, the two piece filing record unit and accompanying selecting mechanism affords a novel selection medium resulting in improved rapid random access filing system operation with simple inexpensive equipment for both selecting and displacing a multiple unit coded card with a single selective operation.

In Fig. 6*a* the code bar locking means is shown with the code bars 16–19 in a locked position as found when the bit table 21 is in any of the positions of Fig. 1*a* or 1*c* through 1*g*. The code bars or elements 16–19 may be assumed similar to those of Fig. 2 and pivoted for movement into one of two adjacent positions. Somewhere intermediate the ends of the bars notches may be provided, in the regions that two adjacent bars meet, for engagement with mating appendages of a friction pad member 48. This pad 48 is adapted to engage the bit elements in either of their two stable positions and prevent rotation about their pivot points provided by rods 20 to the other of their stable positions when the pad is in its upper limiting position. The normal upper limiting position is attained by means of the stops 49 and springs 50, at times when the bit table 21 is at or raised above the drawer level from the position shown by the cams 23 and 24.

A pair of camming arms 52 and 53 is provided for engaging the respective lever arms 54 and 55 of gear segments 56 and 57. It is seen, therefore, that when the gear segments 56 and 57 rotate about their pivot axes 59 and 60, the friction pad 48 is lowered from engagement with the bit elements 16–19. To effect this action, which occurs at the portion of the operating cycle of Fig. 1*b*, and which is shown in Fig. 6*b*, the cam members 23 and 24 are rotated in a clockwise direction to lower the bit table 21. This causes the camming arms 52 and 53 to engage the lever arms 54 and 55 and pivot the gear segments 56 and 57 about their respective axes 59 and 60. Only during the selection position of the operating cycle illustrated in Fig. 1*b* is this action automatically performed by the actuating force imparted by relative movement of the drawer 11 and cabinet 10 which effects rotation of the cams 23 and 24 to place the table in the lowermost position.

The schematic representation in Figs. 1*a*, *b* and *c* represents one desirable arrangement for providing means for actuating the selection device illustrated with particularity in the dotted block 34 of Fig. 7. The means is in the form of a switch comprising the plunger arm 25 and a cooperating fixed contact 62. To automatically place the code bars 16–19 in a coded position the code selection means 34 of Fig. 1, as shown more specifically in the dotted block of Fig. 7, is automatically actuated by lowering of the table to the position of that phase of the operating cycle shown in Fig. 1*b*. The switch contact 62 is thereby automatically closed and accordingly energizes one of the solenoids 63 or 64 from the battery 66 or some other suitable power supply. A code selector switch 68 may be placed in either of the code positions "1" or "0" before the start of the operating cycle to indicate which of the solenoids 63 or 64 is to be actuated. Energization of either solenoid will then raise its respective solenoid actuated plunger rod 70 or 71.

Let us consider in Fig. 7 a single bit element 16, which is rotatable about its pivot axis 15, to be in a position designating the binary digit "1," and assuming that it is desired to change the coded position to "0," the code selector switch 68 is placed in a corresponding position. Actuation of the solenoid 64 during the automatic code selection positioning of the operating cycle, when switch contact 62 is closed, will force the rod 71 upwardly (as shown in the drawing) and cause the bit element 16 to pivot about its axis 20 into the position shown by the dotted line 73. In the same manner the bit element 16 may be conversely changed from the "0" to "1" position by energization of solenoid 63 and lifting of rod 70.

Should the bit element 16 already be in the desired position, the corresponding rod 70 or 71 will move into an unoccupied space and therefore not disturb the already correct coded position. It is to be recognized that a plurality of code selector members or rods and associated relays may be afforded for automatically positioning any desired number of bit elements in the manner disclosed. Alternative mechanical means or other automatic code selector apparatus may be provided, if desired, by those skilled in the art in view of the teachings of this invention to perform similar functions.

As shown in Figs. 8 and 9, simple driving means may be provided for automatically rotating the cams 23 and 24 through the operation cycle illustrated in Fig. 1. Thus, a pinion gear 76 in the drawer assembly 11 is caused to mesh with a complementary rack 77 affixed to the cabinet 10. The rack 77 is adapted to extend to a point just short of the front portion of the cabinet 10. A ratchet mechanism, such as the one way drive described and illustrated in Fig. 14–14, page 368 of "Elements of Mechanism" by Schaumb—Merrill & James; fifth edition, 1944, is included in the pinion gear 76 so that rotation of its axle 78 is effective only when the drawer 11 is being opened and that the gear will slip about its axle 78 when the drawer is being closed. Thus, it is readily seen that the operation cycle is completed when the pinion 76 reaches the forward end of the rack 77 i. e., with the drawer 10 extended to its full open position and cannot be re-initiated until the drawer is closed, thereby automatically resetting the mechanism for a further operating cycle.

As shown in Fig. 9 rotary motion of the pinion gear 76 may readily be transferred to impart rotary motion to the cams 23, 24 by means of a gear linkage system such as that shown.

It is, therefore, clear from the foregoing description of the invention, its construction, and its mode of operation that there is afforded improved and novel random file selector apparatus, for which Letters Patent are desired.

What is claimed is:

1. A filing unit for use with random access filing systems storing a series of files in a vertically inclined individually selectable pack, said unit comprising in combination, an upper record portion adapted for carrying intelligible data, a lower indicia portion including a coded identifying section adapted for individual selection by engagement of external coding elements, a pair of freely moving parallel links coupling said upper portion to said lower portion so that the lower portion is held at a lower limiting position by force of gravity, the parallel links connecting the two portions in such a manner that horizontal movement of the lower portion of the filing unit will transmit vertical, upward movement to the upper portion of the filing unit upon engagement of said external coding elements with the coded section of said filing unit.

2. A filing unit as defined in claim 1 in which said coded section comprises an indented matrix having a plurality of indentations all of the same depth and width and separated by unindented tabs having a width being an integral multiple of the width of said indentations, whereby said coded section may be identified by corresponding digits of a binary numbering system.

3. In combination a two portion filing unit for use in random access filing systems, coded selector means comprising a plurality of separable engageable mating members adapted to be brought into registry on one of said portions, and a movable mechanical linkage coupling said portions.

4. A filing unit for mechanically selectable random filing systems comprising two portions, each one of said two portions being provided with separable engageable mating elements, said elements being adapted upon movement therebetween to be brought into registry, and mechanical means coupling said portions to afford complementary motion therebetween.

5. A filing unit comprising a coded indicia portion, a record storing portion, means on each one of said portions whereby both portions are adapted to be brought into registry and means fastening said portions together with at least one degree of complementary motion therebetween.

6. A random access filing system comprising in combination, a pack of coded individually selectable filing units, a filing case, a drawer in said case containing said pack, mechanically operated coding means in said drawer for registering with and selecting individual filing units, a mechanism in said case, a complementary mechanism in said drawer actuated by said mechanism in said case upon interengagement therewith and upon opening said drawer for automatically positioning said coding means whereby said mechanically operated coding means are actuated to select desired ones of said filing units corresponding to a predetermined code, and means for selecting a coding combination corresponding to desired filing units before the selection mechanism is operated.

7. A system as defined in claim 6 wherein said coding combination corresponds to a plurality of binary digits, and wherein said coding means comprises a plurality of individually movable selector bit elements corresponding to said digits in the form of rectangular bars pivoted about one corner to permit them to occupy only one of two stable positions.

8. A system as defined in claim 7 including a bit table, means for locking said elements to said table and means for relatively moving said table and said filing units in contiguous relationship to select the filing units coded to correspond to the positioning of said elements.

9. A system as defined in claim 8 wherein said means for relatively moving said table and said filing units includes a pair of cams operating said table in a generally rotary path with the table surface bearing said selector elements defining a parallel motion arc contiguous to one side of said pack of filing units.

10. A random access filing system comprising in combination, a filing case having a movable access drawer adapted for receiving a pack of randomly placed coded filing units, a mechanical element fixed to said case, coacting mechanical elements movable mounted in said drawer for engaging said fixed element in said case, and comprising positionable coding selector elements for engaging individual ones of said coded filing units, locking means for said coding selector elements automatically actuated for releasing said coding selector elements for selection of a desired code upon a predetermined small degree of movement in opening said drawer, means subsequently moving said coding selector elements to a selected position upon a further degree of movement in opening said drawer, means actuating said locking means for fixing said coding selector elements in said selected position upon a further degree of movement in opening said drawer, means causing relative movement between said coded filing units and said coding selector elements upon further motion of said drawer, means for displacing a selected filing unit from said pack responsive to said relative movement, and means preventing further action of said selector elements thereafter upon any further motion of said drawer.

11. In random access filing equipment, a plurality of selectively engageable randomly interspersed filing units having a coded engaging structure on one edge thereof and arranged in a pack, a movable rack holding said pack, complementary coded engaging means positioned near said edge to move with said rack and having variably selectable movable coding elements, the weight of each one of said filing units being such as to provide a force biasing said filing units toward said complementary coded engaging means, cam means for moving said complementary engaging means contiguously across said edge of the filing units to thereby engage a selected one of said filing units with movement of said rack whereby only the coded filing units corresponding to the position of said coding elements are engaged by said complementary engaging means, and means for moving the engaged unit to an accessible position away from said pack, said filing units comprising two portions and means interconnecting said portions providing relative motion therebetween, said last mentioned means comprising parallel links movably joining the separable portions of each filing unit whereby horizontal movement of one portion thereof transmits vertical, upward movement to the other portion thereof.

12. In random access filing equipment, a plurality of selectively engageable randomly interspersed filing units having a coded engaging structure on one edge thereof and arranged in a pack, a movable rack holding said pack, complementary coded engaging means positioned near said edge to move with said rack and having variably selectable movable coding elements, the weight of said pack of filing units providing a force biasing said filing units toward said complementary coded engaging means, means for relatively moving said complementary engaging means contiguously across said edge of the filing units with movement of said rack whereby only the coded filing units corresponding to the position of said coding elements are engaged by said complementary engaging means, and means for moving the engaged unit to an accessible position away from said pack, said rack being orientated with said edge extending downwardly thereby permitting the weight of said filing units to bias said filing units in a downward direction, said filing units comprising a generally rectangular plane card with a bottom corner removed to provide a fifth edge at an angle of the order of 135° with respect to the two adjacent edges of the rectangle, and card limit stops in said rack positioned contiguous to said pack midway along said fifth edge and along the opposite vertical side to hold said cards secure from lateral movement.

13. A random access filing system including, in combination, a filing case having a movable access drawer adpated to be wholly received within the case and to be substantially fully withdrawn therefrom for gaining access thereto, a pack of randomly placed filing card units in the drawer, card unit selecting means within the drawer operable to project a selected card unit from the pack, means actuating said card unit selecting means in response to withdrawal movement of the drawer and operable in the initial opening movements of the drawer to project a selected card unit from the pack, and means for retaining said selected card unit in projected position throughout the further opening movement of the drawer.

14. A random access filing system including, in combination, a filing case having a movable access drawer therein adapted to be substantially wholly received within the case to assume the fully closed position and capable of being substantially wholly withdrawn from the case to assume the fully opened position, a pack of randomly placed filing card units, means in the drawer supporting the pack in a position spaced above the bottom of the drawer, cyclically operable means within said space for selecting and distinguishing one of the cards from the pack, said cyclically operable means normally being out of engagement with the cards of the pack but being operable during a portion of its cycle of operation to engage the edges of the cards of said pack and to select a desired card unit therein and to raise the selected card above the pack, and means responsive to the withdrawal movement of the drawer for causing the cyclically operable means to perform its cycle of operation.

15. A random access filing system including, in combination, a filing case having a movable access drawer in the case adapted to be wholly received therein in closed position and to be withdrawn substantially from the case in fully opened position, a plurality of filing cards, means in the drawer supporting the cards in vertical planes and with their lower edges spaced above the bottom of the drawer, a card selecting mechanism in the drawer within the space between the lower edges of the cards and the bottom of the drawer and normally being out of contact with the cards, said card selecting mechanism having both a vertical motion and a sidewise motion when in operation, means for adjusting said mechanism to select a desired card, said card selecting mechanism being operable in its vertical movement to engage the cards and select the one for which it is adjusted and operable in its sidewise movement to raise the selected card above the other cards in the drawer, and means operatively associating the card selecting mechanism with the movement of the drawer and causing the card selecting mechanism to perform its upward and sidewise operating motions in response to the withdrawal movement of the drawer from the case.

16. A random access filing system including, in combination, a plurality of filing units randomly placed with respect to one another and compactly assembled in a group with their respective planes extending parallel to one another, a movable support for the filing units capable of bodily moving the units as a group from one position in which the units are relatively inaccessible to another position in which the units are relatively accessible, a filing unit selecting mechanism associated with the support and jointly bodily movable therewith, said mechanism also having a movement independent of the support and toward and away from the group of filing units, adjustable unit selecting elements carried by the mechanism and capable of interengaging with the units as the mechanism is thus moved toward the filing units and of selecting a desired unit and projecting the same relative to the balance of the units, and means operatively associating the unit selecting movement of the support and causing the mechanism to perform its selecting movement as the support is moved from the inaccessible position to the accessible position.

17. A random access filing system including, in combination, a plurality of filing units compactly assembled into a group with their respective planes extending parallel to one another, a movable support for the filing units and capable of bodily moving the units as a group in a direction substantially perpendicular to the planes in which they are assembled, a filing unit selecting mechanism associated with the support and jointly bodily movable therewith, said selecting mechanism also having a movement independent of the support and toward and away from the group of filing units, one or more filing unit interengaging elements carried by the mechanism and being adjustable relative to the mechanism to interengage with a selected one of the filing units in the group, said elements interengaging with the selected filing units as the mechanism moves toward the filing units and projecting the same relative to the group of units, and means operatively associating the filing unit selecting movement of the mechanism with the movement of the support and causing the unit interengaging elements to perform their function as the group of filing units is bodily moved by the support.

18. A random access filing system comprising in combination: a plurality of selectively engageable randomly interspersed filing units each having a coded engaging structure at the bottom end thereof; each of said units comprising two portions, one record portion adapted for carrying intelligible information, and the other portion carrying said coded engaging structure; and a mechanical linkage comprising a pair of parallel members coupling the two portions of each filing unit; a filing case for said filing units having a movable access drawer; means in said drawer holding said units in a pack with limiting means for preventing lateral motion thereof; a movable complementary engaging structure in said drawer coded for selecting individual filing units; means to select desired codes from said complementary structure; and filing unit positioning means for moving said complementary structure in a lateral wiping motion contiguous to the bottom edges of said filing units thereby to register said complementary structure with the engaging structure at the bottom edges of the filing units in such a manner that horizontal wiping movement of said movable complementary engaging structure in the drawer with the coded bottom edge of said coded portion transmits vertical upward movement to the record portion through the medium of said linkage.

19. A random access filing system including, in combination, a cabinet having movable support structure therein for a pack of randomly placed filing units and adapted to be moved to a position permitting access thereto, filing unit selecting means within the cabinet operable to project a selected unit from said pack, means actuating said unit selecting means in response to movement of the unit support structure toward its position of access and operable during such movement to project one or more selected units from the pack, and means for retaining said selected unit in projected position.

20. A random access filing system for a plurality of filing units randomly placed with respect to one another and compactly assembled in a group with their respective planes extending substantially parallel to one another, said system including, in combination, a movable support for the filing units capable of moving the units as a group from one position in which the units are relatively inaccessible to another position in which the units are relatively accessible, a filing unit selecting mechanism associated with said support, said mechanism having a movement independent of the support toward and away from the group of filing units, and means for so moving said filing unit selecting mechanisms into interengaging position with the units as the said movable support for said filing units is moved to the position in which said units are relatively accessible and during which movement said unit selecting mechanism will project selected filing units relative to the balance of the units.

References Cited in the file of this patent

UNITED STATES PATENTS

| | | |
|---|---|---|
| 1,433,836 | Metcalf | Oct. 31, 1922 |
| 1,606,118 | De Loach | Nov. 9, 1926 |
| 1,658,363 | Watters et al. | Feb. 7, 1928 |
| 1,821,245 | Straubel | Sept. 1, 1931 |
| 1,925,705 | Robinson | Sept. 5, 1933 |
| 2,602,451 | Hofgaard | July 8, 1952 |

FOREIGN PATENTS

| | | |
|---|---|---|
| 16,666 | Great Britain | 1912 |
| 457,200 | Canada | June 7, 1949 |